United States Patent [19]
Ilon

[11] 3,978,531
[45] Sept. 7, 1976

[54] LIFTING DEVICE
[76] Inventor: Bengt Erland Ilon, Benzeholzstrasse 39, CH-6045 Meggen, Luzern, Switzerland
[22] Filed: Mar. 25, 1975
[21] Appl. No.: 561,976

[30] Foreign Application Priority Data
Apr. 1, 1974 Sweden.............................. 7404343

[52] U.S. Cl. ........................................ 5/81 R; 5/92
[51] Int. Cl.² ........................................ A47B 83/04
[58] Field of Search............................... 5/81, 82, 92

[56] References Cited
UNITED STATES PATENTS
| | | | |
|---|---|---|---|
| 3,178,732 | 4/1965 | Stibitz .................................. | 5/81 R |
| 3,526,908 | 9/1970 | Davis .................................... | 5/81 R |
| 3,757,788 | 9/1973 | Renfroe ................................ | 5/81 R |

Primary Examiner—Casmir A. Nunberg
Attorney, Agent, or Firm—Bacon & Thomas

[57] ABSTRACT

A lifting device which may be rolled to a position under an object to effect lifting thereof. The device of the invention is particularly useful in the lifting of human patients as it accomplishes lifting without sliding action between the patient and the exterior of the lifting device. The lifting device includes a hollow member of flexible material with a recess running from end to end entirely through the member. The member also defines an enclosed chamber surrounding the recess and having a generally elongated, flattened, toroidal configuration. Preferably, the chamber is filled with a fluid medium for supporting the member and maintaining its shape. A protecting device is engageable both with said recess and with the exterior of said member to cover and protect the same. At least part of the surface of the hollow member which faces the interior of the chamber may include a layer of lubricant thereon to facilitate rolling of the member.

10 Claims, 12 Drawing Figures

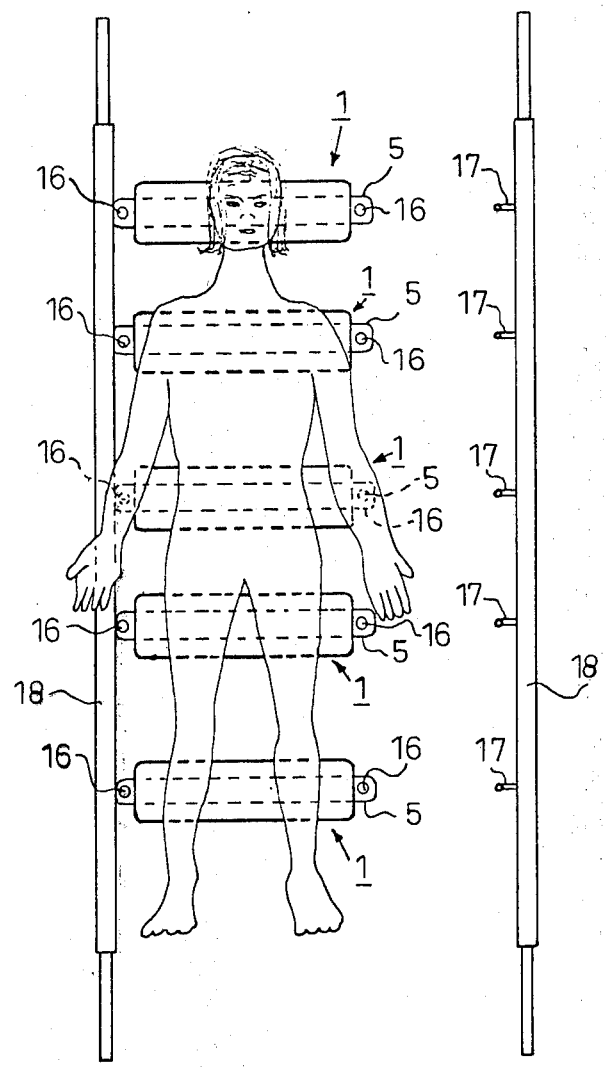

LIFTING DEVICE

BACKGROUND

1. Field of the Invention

The present invention relates to a device that is intended to be wholly or partly placed beneath a human body, the body of an animal, or an inanimate object which is wholly or partly lifted or raised from a substrate. The device comprises a hollow member made of a flexible material that is expanded by means of at least one medium, preferably a pressurized medium, to give the hollow member a certain shape.

2. Description of the Prior Art

Two different types of such lifting devices have previously been proposed, i.e., devices with a sleeve driven by compressed air and made from an elastic material and devices shaped as a pillow of elastic material which pillow is kept extended by means of compressed air and which is operable by means of an operating means. This operating means has an anchoring portion that is sealingly connected to two ends of the pillow which face each other. To perform a lifting action the devices of the first mentioned type require access to an assembly for compressed air which, however, is not required to operate the pillow shaped device. However, both devices have a primary disadvantage in that, at most, the extent of their travel corresponds to only a fraction of the total length of the device. In known devices operating with compressed air, the travel actually corresponds to half the total length of the device and in the pillow shaped devices this travel is only somewhat greater. As a result, the total length of the known devices may not be utilized for the lifting action but only a fraction thereof, is used.

SUMMARY

One purpose of the present invention is to provide a lifting device of the type mentioned above wherein the total length of the lifting device is utilized for the lifting or raising operation. This is accomplished by giving the hollow member of the lifting device an annular shape so that the wall of the hollow member defines a recess extending entirely through the hollow member, permitting insertion of at least one driving element, such as an attendant's arm or a driving stick. The driving stick, or, alternatively, the attendant's arm, either frictionally grips or is positively secured to the wall of the hollow member in the region of the recess. Then, by pushing the arm or driving stick into the recess, the hollow member is driven a distance that at least corresponds to the outer dimensions of the hollow member.

Another purpose of the present invention is to permit the lifting device to be more easily handled. This is accomplished by including an inner layer of lubricant in the hollow member, preferably a layer of silicone, in order to reduce the inner frictional resistance of the wall of the hollow member during the driving thereof.

A further purpose of the present invention is to prevent the surface of the lifting device from contacting the object to be lifted, especially to prevent transfer of bacteria in the treatment of human patients and animals. This is accomplished by a particular bag shaped container, which bag is adapted to be applied to the hollow member in a certain way.

Another purpose of the present invention is to design the hollow member so that the same has a structurally simple shape and at the same time possesses the required wear characteristics.

DRAWING

The invention will be further described below with reference to the accompanying drawings, in which.

Figure 10:
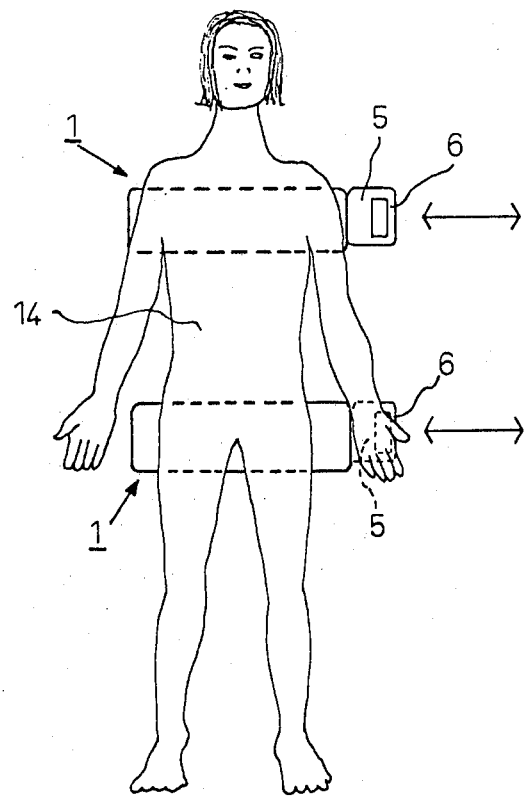
Figure 12:
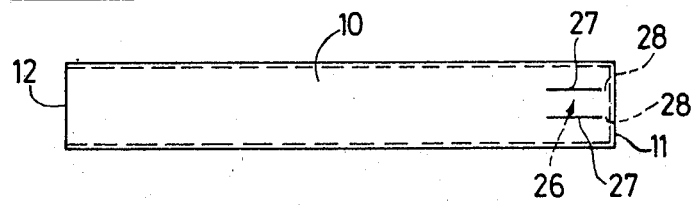

FIG. 10 schematically illustrates a person lifted by two hollow members;

FIG. 11 illustrates a person lifted or raised by five hollow members intended to be mounted to supporting bars in order to define a stretcher; and FIG. 12 illustrates an alternate embodiment of the baglike container.

A lifting device designed according to the invention to lift patients comprises a sleeve shaped hollow member 1, which preferably is made from an elastic rubber material. The wall 2 of the hollow member is shaped to define a recess 3 extending entirely through the hollow member 1. Thus, the portions of the wall 2 of the hollow member on both sides of the recess each have an endless configuration. This may be observed if one starts from the exterior of the hollow member and follows the same around one end of the hollow member and into the recess, then along the recess to the second end of the hollow member and via this to the exit point on the exterior of the hollow member 1. The wall 2 of the hollow member is kept extended by means of a medium, which in the exemplifying embodiment comprises compressed air, fed through a valve 4 or a cannula inserted obliquely inwardly through a thickened portion of the wall 2 of the hollow member.

As a result of the endless structure of the wall 2 portions of the hollow member 1 may be driven a distance at least corresponding to the total length thereof.

Figure 1:
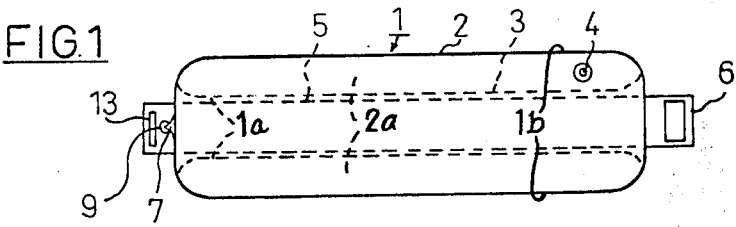
FIG. 1 is a plan view illustrating the hollow member according to the invention with a driving element inserted therein.
Figure 2:
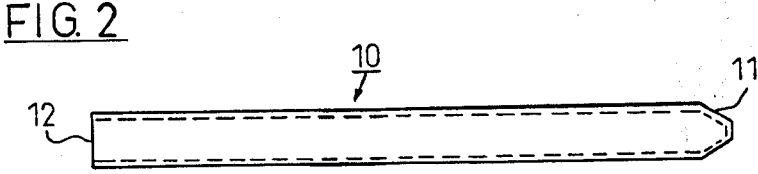
FIG. 2 is a plan view showing a bag shaped container according to the invention.

It will be readily apparent from the present description and from the drawing that hollow member 1 may be considered to have an inner portion 1a and an outer portion 1b (see FIG. 1). The inner portion 1a surrounds and defines recess 3, while the outer portion 1b surrounds the inner portion and defines the exterior surface of the member. As will also be readily apparent, the inner and outer portions define an enclosed chamber 2a (FIG. 1) in member 1, the enclosed chamber surrounding recess 3 and having a generally elongated, flattened, toroidal configuration.

The driving action may be performed by means of different driving means, in the simplest case by an attendant inserting his arm into the recess 3. The hollow member 1 is thereby displaced a distance dependent upon how far the arm is inserted. The displacement distance is even not limited to slightly more than the length of the hollow member 1. Indeed, if so required, the displacement may be substantially greater; principally, the hollow member 1 may be displaced a distance corresponding to the length of the attendant's arm.

However, according to the exemplifying embodiment, driving of the hollow member is not obtained by means of an attendant's arm but with the aid of a driving stick 5, which may displace the hollow member 1 a distance that somewhat exceeds the total length thereof, which in the normal case is quite enough. The driving stick 5 is designed to fit into the recess 3 and the length thereof is greater than that of the hollow member 1. To facilitate the driving, one end of the driving stick 5 is provided with a handle 6 and the second end of the same is suitably connected to the wall 2 of the hollow member 1. The connection is not required to effect the driving, but it may be advantageous in some cases. The connection is preferably intended to be releasable from the wall 2 of the hollow member and/or the driving stick 5. A particularly advantageous form of releasable connection comprises a projection 7 that is securely affixed to the wall 2 of the hollow member. The projection 7 has an elastic end knob 8, to be pressed through a hole 9 in the end of the driving stick 5 so that the knob, after pressing through the hole, expands and locks the end 7 against being pulled outwardly during driving of the hollow member 1. In another type of connection which is useful in practice the end 7 is provided with a loop (not shown) through which a locking pin (not shown) may be inserted to prevent the pulling of the end 7 out from the opening 9.

Figure 3:
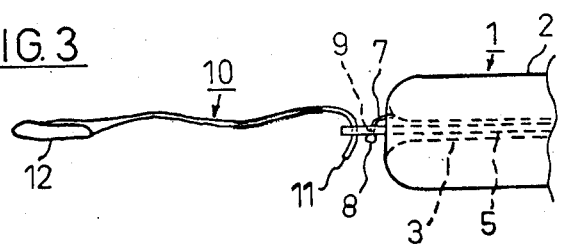
FIG. 3 illustrates this container mounted to the driving element.
Figure 4:
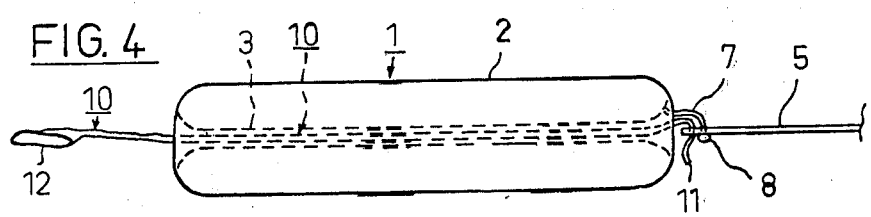
FIG. 4 illustrates the container drawn into a recessed portion of the hollow member.
Figure 5:
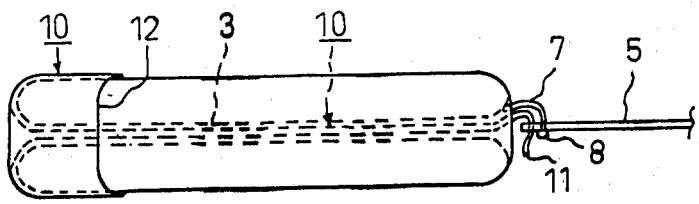
FIG. 5 illustrates the end of a container folded around the hollow member.

When the hollow member 1 is to be used for handling patients it is essential — and in many cases for bacteriological reasons absolutely necessary — to keep the wall 2 from contacting the body to be lifted. In order to prevent such body contact, the device according to the present invention includes a bag shaped container 10 of a flexible material, preferably a plastic material. This container 10 is of longitudinal shape, and the length thereof exceeds that of the hollow member 1. The container is closed at one end 11 thereof and open at the other end 12. Furthermore, the container 10 is designed so that it may be pulled into the recess 3 of the hollow member 1 and at the same time be folded outwardly around the hollow member 1. The container 10 is mounted to the driving stick 5 in the region of the closed end 11 of the container. In order to permit this, the stick has a longitudinal, traverse opening 13 at one end thereof. In case the lifting device according to the invention is to be used to raise or lift patients without the wall of the hollow member engaging the body of the patient, the bag shaped container 10 is used. This is accomplished by driving the stick 7 through recess 3 until the end thereof provided with the opening 13 lies free. The closed end of the container 10 is thereafter inserted through this opening 13 (FIG. 3). Subsequently, the driving stick 7 is retracted until the container 10 totally or partly extends through the recess 3 but with the open end portion 12 of the container lying outside the recess (FIG. 4). This end portion 13 is folded outwardly over the hollow member 1, so that the same defines a cover for the end of the hollow member 1 (FIG. 5). Thus, the lifting device is ready for lifting or raising a patient 14 as schematically indicated in the drawings.

The container 10 illustrated in FIGS. 1–7 is well suited for the present purposes. However, the design of the container may be varied in order to obtain certain, special advantages. As is shown in FIG. 12, the container 10 at its closed end 11 (in this embodiment the closed end may be open) is provided with an inner passage 26, which opens against the open end 12 of the container 10. The passage is manufactured in a very simple way, namely by providing the container with two weld beads or seams 27, which weld together opposed wall portions of the container 10. The beads 27 are arranged to define a passage 26 of such size that the end portion of the driving stick 5 may be inserted into the passage 26. The passage 26 opens at the closed end of the container 10, i.e., the weld beads 27, while extending to locations adjacent to the sealed edge of the container 10, start a bit away from the sealing edge so that between the sealing edge and the weld beads 27 apertures 28 are defined, through which apertures air may flow when the driving stick 5 is inserted into and withdrawn from the passage 26. To ensure tightness of fit, the passage is preferably slightly less in size than that end portion of the driving stick 5 which is to be inserted in the passage. This means that the container 10 may, in a simple way, be secured at the end portion of the driving stick 5.

This structural embodiment of the container 10 gives the following handling possibilities. The driving stick 5 is brought from one side through recess 3 of the hollow member 1, so that the end portion thereof projects from the other side. The driving stick 5 is held in one hand and the hollow member is also held in the same hand. The container 10 is held in the other hand, and the hollow member 1 with the driving stick 5 is inserted into the container 10 until the end portion of the driving stick enters the passage 26, which means that the container 10 will be secured on the driving stick 5.

Thereafter, the driving stick is withdrawn, whereby the container 10 follows the stick 5 into the recess 3. The container length is so chosen that portions of the container completely or partially cover the outside of the hollow member when the major part of the driving stick 5 is withdrawn from the hollow member 1. The device is then ready for a lifting operation.

After the lifting operation, the driving stick 5 is completely withdrawn from the recess 3, and is loosened from the container 10 by withdrawing it from the passage 26. Finally, the container 10 is withdrawn in the opposite direction from the recess 13 thereof.

The shape of the container 10 is such that it may be saved and used as a storage bag for the hollow member 1 and the driving stick 5, and the stick may already be inserted into the passage 26 during storage.

The container 10 has been described as being closed at one end. In some cases this is not necessary, and, therefore, the container 10 may be open at both ends. If desired, such an open container may be sealed after use by knotting together its ends. Open containers of this type may be secured at the driving stick 5 either by providing the containers with one or more couplings for connection to the driving stick, or by providing one or more narrow passages, pockets or the like.

Figure 6:
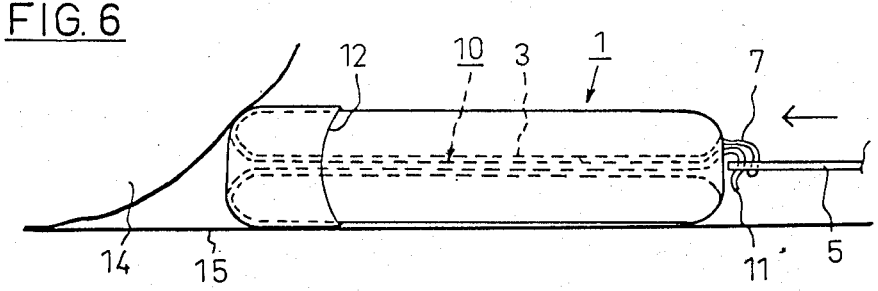
FIG. 6 shows the hollow member positioned to engage an object to be lifted.
Figure 7:
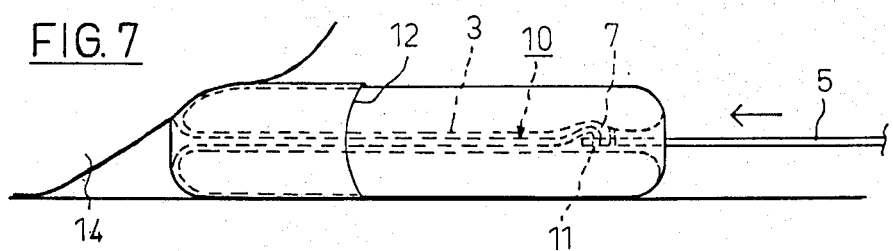
FIG. 7 shows the hollow member during the lifting of the object.

To lift the patient the hollow member 1 is placed beside the patient on the substrate 15 and the end of the hollow member 1 covered by the container 10 is put against the body 14 of the patient (FIG. 6). In this connection, it may be especially noted that it is the inside of the container that engages the body 14. Thereafter, the driving stick 5 is pushed into the recess 3, which means that the hollow member 1 is rolled underneath the body 14 and lifts the same (FIG. 7). By way of the rolling motion of the hollow member 1, the lifting will be performed without sliding of the portion of the hollow member 1 covered by the container against the body 14. In this manner, the hollow member 1 may be rolled entirely beneath the patient, and thus the same provides lifting action along the whole length thereof. This is a key characteristic since thereby the hollow member need not be dimensioned with a greater length than the dimension of the portion of the body 14 that is to be lifted. By the rolling motion of the hollow member 1, the container 10 may cover an ever increasing portion of the exterior of the hollow member 1. Also, the portion of the container 10 covering the exterior of the hollow member 1 will be positioned with the inside thereof outwardly directed. Even if the driving stick 5 is pushed so far that the end portion thereof extends out from the recess 3, the stick will still be enclosed inside the container 10.

During lifting, bacterial from the body and also any purulent matter, contamination and the like will be brought into contact with the inside of the container 10. When the patient is lowered by rolling of the hollow member 1 in the reverse direction, the container 10 is retracted partly into the recess as may be seen in FIG. 4. The bacteria and any blood, purulent matter, contamination and the like clinging to the inside of the container 10 will, by the lifting movement, be present only inside the container 10. Thereafter this may be hermetically closed by knotting or otherwise sealing the open end thereof, whereafter the same may be released from the driving stick 5, may be pulled out from the recess 3 and disposed of in a totally hermetically closed condition.

The container 10 may also be used when the hollow member 1 is operated by an attendant's arm. The same result is obtained when the closed end 11 of the container 10 is manually held.

By providing a number of hollow members in a suitable manner it is possible to raise and/or give support to a patient during an operation; it is possible to facilitate dressing of a resting patient; and it is possible to facilitate making of the bed or performance of excretory functions. Furthermore, it is possible to place X-ray plates beneath the patient for X-ray treatment of the back or the stomach (FIG. 10).

The lifting device according to the invention is also well suited for forming a stretcher. In this case each end of the driving stick 5 for each hollow member 1 is provided with an end opening 16. In such a manner the driving sticks 5 may be hooked onto hook shaped pins 17 corresponding to the end openings 16, which pins extend from longitudinal support means 18. In this manner it is for example possible to form a stretcher to transfer a patient with a back injury who must not under any circumstances be twisted during the lifting action. However, the lifting device according to the invention is not exclusively useful for handling patients but may advantageously be used to handle animal bodies or objects, the surfaces or containers of which are delicate and must not be subjected to a sliding action.

The hollow member 1 according to the invention may be made from a flexible rubber-like material, such as plastic, synthetic fabric or reinforced plastic. To facilitate the operation of driving the hollow member, the inner wall 2 of the hollow member may be covered with a layer 19 of a lubricant, such as silicone, thereby reducing the inner frictional resistance of the wall 2.

The hollow member may be filled with a pressurized gas or with a liquid having a suitable composition instead of being filled with compressed air. Alternatively, loosely positioned elements, such as, plastic beads, may be provided in the hollow member 1 to keep the member extended. In certain cases it may be advantageous to insert elements positioned in a lubricating liquid in the hollow member or to insert elements resting in a compressed medium.

Figure 8:
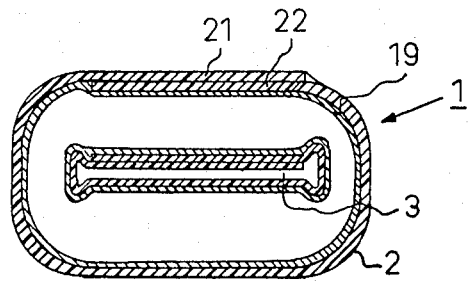
FIG. 8 illustrates a section of the hollow member.
Figure 9:
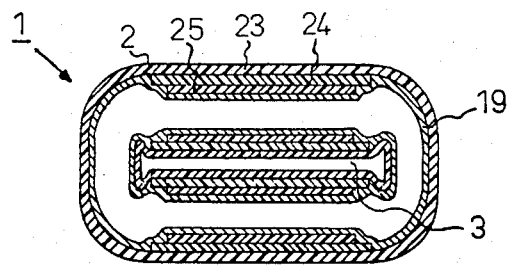
FIG. 9 shows a section of an alternatively shaped hollow member.

In order to guide the hollow member during the rolling motion, the longitudinal portion of the wall 2 which lies against the substrate and/or the oppositely positioned longitudinal portion may be provided with thicker walls than the rest of the hollow member. These thicker walls may comprise two wall portions positioned beside each other (FIG. 8) or may comprise three wall portions positioned beside each other (FIG. 9).

This may be accomplished by joining the hollow member 1 with at least one longitudinal splice 20, whereby the portions 21, 22 on both sides of the edges defining the splice 20 are brought to overlap each other. Alternatively, the portions may be positioned edge-by-edge by a splice 23, whereby plies 24, 25 of material cover the splice 23 on the inside. Sealing of the splice and application of the plies of material, respectively, may, where rubber material is used, be accomplished by vulcanization, or, where plastic material is used, by welding.

Finally, it may be mentioned that the opening 13 in the driving stick 5 for the anchoring of the container 10 is preferably shaped as a slot and positioned between the hole 9 and the end edge of the driving stick 5.

It will, of course, be apparent to those skilled in the art that the lifting device according to the present invention may be varied within the scope of the following claims and that the field of use for the device is comparatively large.

I claim:
1. A device for lifting an object comprising, a hollow member of thin, flexible material, said member having ends and having a recess extending entirely through the member from one end to the other, said recess being open at each end of the member, said member having an inner portion surrounding and defining said recess and an outer portion surrounding said inner portion and defining the exterior surface of said member, said inner and outer portions defining an enclosed chamber in said member, said chamber surrounding said recess and having a generally elongated, flattened, toroidal configuration, said inner and outer portions of said member forming a continuous, uninterrupted surface, and a protecting means coupled with said member, said protecting means being hollow and having inside and outside surfaces, said protecting means being engageable both with said recess and with the exterior of said member to cover and protect the same, said inside and outside surfaces of said protecting means being inverted when in engagement with the exterior of said member, whereby rolling of said member in a lifting direction causes the inner portion of said member to move to the outer portion and causes part of said protecting means to move from within said recess to the exterior of said member, part of said inside surface of said protecting means thereby becoming everted to face outwardly and to cover an ever increasing area of the exterior of said member.

2. A device as defined in claim 1 including means for driving said member in a rolling action, said driving means being selectively engageable with said member in the region of said recess, said driving means being configured so as to pass through said recess during the driving action, said driving means having an end for cooperation with an end of said protecting means, one of said ends including means for effecting a selectively releasable connection between said driving means and said protecting means.

3. A device as defined in claim 2, wherein said releasable connecting means includes a passage in said protecting means, said passage being narrower in width than said protecting means, said protecting means including opposed walls, said passage being defined by a pair of spaced seams joining said opposed walls of said protecting means together, said passage being adapted to receive said driving means therein.

4. A device as defined in claim 2, wherein said releasable connecting means includes an opening in said driving means for receiving one end of said protecting means, said opening effecting selectively releasable attachment of said protecting means to said driving means.

5. A device as claimed in claim 3, wherein said one end of said container has a converging, tapered configuration to facilitate insertion thereof into said opening of said driving means.

6. A device as defined in claim 2, wherein said driving means is elongated and is of greater length than said recess of said member, whereby said driving means may be driven through said recess such that said one end of said driving means which cooperates with said protecting means may be disposed outside said recess when said driving means extends entirely through said recess.

7. A device as defined in claim 6, wherein said protecting means is elongated and is of greater length than said recess of said member.

8. A device as defined in claim 2, wherein said protecting means comprises a bag-shaped container one end of which is open, the other end of which is selectively, hermetically sealable.

9. A device as defined in claim 8 wherein said lubricant is silicone.

10. A device for lifting an object comprising, a hollow member of thin, flexible material, said member having ends and having a recess extending entirely through the member from one end to the other, said recess being open at each end of the member, said member having an inner portion surrounding and defining said recess and an outer portion surrounding said inner portion and defining the exterior surface of said member, said inner and outer portions defining an enclosed chamber in said member, said chamber surrounding said recess and having a generally elongated, flattened, toroidal configuration, said member being inflated by pressurized fluid in said chamber, said member including a surface facing the interior of said chamber, at least part of said interiorly facing surface including a layer of lubricant thereon to facilitate rolling of said member.

* * * * *